United States Patent
Jeong et al.

(10) Patent No.: US 7,476,424 B2
(45) Date of Patent: Jan. 13, 2009

(54) LIQUID CRYSTAL DISPLAY DEVICE AND METHOD FOR FABRICATING THEREOF

(75) Inventors: Ho-Young Jeong, Seoul (KR); Hyeon-Ho Son, Gyeonggi-Do (KR)

(73) Assignee: LG Philips LCD Co., Ltd., Seoul (KR)

( * ) Notice: Subject to any disclaimer, the term of this patent is extended or adjusted under 35 U.S.C. 154(b) by 408 days.

(21) Appl. No.: 11/311,345

(22) Filed: Dec. 20, 2005

(65) Prior Publication Data
US 2006/0170853 A1 Aug. 3, 2006

(30) Foreign Application Priority Data
Jan. 31, 2005 (KR) .................. 10-2005-0008812

(51) Int. Cl.
*G02F 1/1337* (2006.01)
(52) U.S. Cl. ..................... 428/1.26; 349/135
(58) Field of Classification Search ................. 428/1.2, 428/1.23, 1.26, 1.51; 349/43, 123, 125, 130–131, 349/106
See application file for complete search history.

(56) References Cited

U.S. PATENT DOCUMENTS

| | | | | |
|---|---|---|---|---|
| 4,464,134 A | * | 8/1984 | Lackner et al. | 445/24 |
| 5,571,579 A | * | 11/1996 | Kato et al. | 428/1.25 |
| 2004/0056987 A1 | * | 3/2004 | Song | 349/43 |
| 2004/0257488 A1 | * | 12/2004 | Lee et al. | 349/43 |

\* cited by examiner

*Primary Examiner*—Keith D Hendricks
*Assistant Examiner*—Sophie Hon
(74) *Attorney, Agent, or Firm*—Birch, Stewart, Kolasch & Birch, LLP

(57) ABSTRACT

A liquid crystal display device has no defects caused by a rubbing process. The liquid crystal display device includes a first substrate, a second substrate, a liquid crystal layer injected between the first substrate and the second substrate, and a liquid crystal alignment layer that arranges alkane chains having at least 18 carbon atoms in parallel toward the substrate. The siloxane-based liquid crystalline alignment layer produces a uniform layer that resists defects and delamination.

19 Claims, 2 Drawing Sheets

LIQUID CRYSTAL DISPLAY DEVICE AND METHOD FOR FABRICATING THEREOF

This application claims priority under 35 U.S.C. §119 of Korean application no. 10-2005-0008812, filed in Korea on Jan. 31, 2005, the entire contents of which are hereby incorporated by reference.

BACKGROUND OF THE INVENTION

1. Field of the Invention

A liquid crystal display device has no defects when aligned by using a siloxane-based alignment film.

2. Description of the Related Art

The recent development of portable electronic equipment such as mobile phones, PDAs and notebook computers have resulted in a gradual increase in the demand for light and small flat panel display devices suitable for these products. Active research covers such flat panel display devices such as liquid crystal displays (LCDs), plasma display panels (PDPs), field emission displays (FEDs) and vacuum fluorescent displays (VFDs) and the like. Especially, the LCDs are currently in the limelight due to the mass production advantages of the technology, the versatility of the technology and the high-definition quality of the display.

Liquid crystal display devices of the related art form alignment films from polyamic acid, polyimide and the like on the interior facing surfaces of two substrates. A cell with a sandwich structure forms by injecting a nematic liquid crystal layer having a dielectric anisotropy between the two substrates.

An example of a typical related art liquid crystal display device is a twisted nematic (TN) mode liquid crystal display device, where the major axis of the liquid crystal molecules in the liquid crystal layer continually twist at an angle of 90 degrees from one substrate to the other substrate.

Further, super twisted nematic (STN) mode liquid crystal display devices and in plain switching (IPS) mode liquid crystal display devices have high contrast and less optical dependency on such factors as viewing angle when compared to the TN type liquid crystal display devices. The STN mode liquid crystal display uses a material that blends a nematic type liquid crystal with a chiral component. The STN mode liquid crystal display also uses the double refraction effect generated by the consecutive twist of more than 180 degrees by the major axis of the liquid crystal molecules between the upper substrate and the lower substrate.

These displays require various forms of liquid crystal alignment that can be achieved by rubbing the liquid crystal alignment film.

However, rubbing the liquid crystal alignment film is generally carried out by the process of scrubbing the alignment film with fabric. Thus, static electricity easily generates so that foreign substances such as dust and the like are absorbed on the alignment film. Rubbing the liquid crystal alignment film consequently decreases the yield and the productivity of the liquid crystal display module by requiring a separate washing process after rubbing.

Moreover, rubbing causes defects in the liquid crystal display device by generating a linear spot according to the rubbing direction of the rubbing fabric during the rubbing process. Also, light leakage arises from non-uniformities of the alignment at the step region of the substrate and the like. As a result, there is a need for technologies that eliminate the rubbing required to induce alignment.

SUMMARY OF THE INVENTION

Accordingly, the invention solves the above-mentioned problems of the related art technology. Thus, an object of the invention is to provide a liquid crystal display device capable of being manufactured without a rubbing process, including the TN liquid crystal display device, the STN liquid crystal display device and the IPS mode liquid crystal display device.

The invention, in part, pertains to a liquid crystal display device that includes a first substrate, a second substrate, a liquid crystal layer injected between the first substrate and the second substrate, and a liquid crystal alignment layer wherein an alkane chain having at least 18 carbon atoms is arranged in parallel directed toward the substrates. The liquid crystal alignment layer can be formed at the upper part of the light block region of the first substrate and the second substrate.

In the invention, the display device can include at least one common electrode and pixel electrode substantially alternatively arranged in parallel over the first substrate, a gate line and a data line that define the unit pixel region crossing each other, and a thin film transistor serving as a switching device.

In the invention, the pixel electrode can be formed over the first substrate by being bent more than about 0 degrees and less than about 45 degrees toward the extended direction of the gate line. The gate line may be formed at a distance of more than about 100 μm from the next gate line, and the liquid crystal alignment layer may be formed at the upper part of the gate line.

The invention, in part, pertains to a liquid crystal alignment layer made from polyamide resin represented by chemical formula 1, where R1 is a tetravalent organic group and R2 is a straight chain alkane chain having at least about 18 carbon atoms.

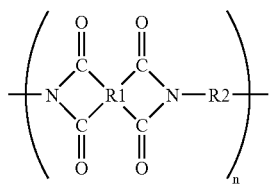

[chemical formula 1]

In the invention, the straight alkane chains arrange the liquid crystal molecules that constitute the liquid crystal layer in parallel toward the substrate abutting the liquid crystal alignment layer.

In the invention, the liquid crystal display device may additionally include a separate sub-layer, i.e., a dissepiment or partition, for forming the liquid crystal alignment layer that could form the liquid crystal alignment layer at the side of the sub-layer.

Also, the sub-layer may be made from an inorganic insulating material such as SiOx or SiNx and the like and from metal materials such as Au, Ag, Al and the like. Further, the liquid crystal alignment layer may have a component chemically absorbed onto, i.e., bonded with, the side of the sub-layer, and it may be formed from a self-assembled monolayer that includes straight alkane chains having at least 18 carbon atoms. This molecular component may include a silylated organic material formed by chlorosilylation, alkoxysilylation or isocyanatesilylation. In this case, the liquid crystal alignment layer is formed through the combination of the surface of the sub-layer with siloxane.

The invention, in part, pertains to a method for manufacturing a liquid crystal display device that includes providing a first substrate, forming a gate line over the first substrate, forming common electrodes and pixel electrodes substantially alternatively arranged in parallel over the first substrate, forming a gate line over the first substrate, providing a second substrate, preparing a liquid crystal alignment layer including straight alkane chains having at least 18 carbon atoms arranged in parallel toward the substrate, and forming a liquid crystal layer between the first substrate and the second substrate.

In the invention, the liquid crystal alignment layer may be formed by coating a polyimide thin film including the straight alkane chains over the substrate, and dry-etching the coated polyimide thin film. Also, the liquid crystal alignment layer may be formed from a polyimide thin film including straight alkane chains on the substrate by inkjet printing. Also, forming the liquid crystal alignment layer may include forming the sub-layer from inorganic insulating materials or metals such as Au, and forming a self-assembled monolayer including alkane chains having at least 18 carbons on the side of the sub-layer.

In the invention, multiple liquid crystal alignment layers may be formed between the first substrate and the second substrate, wherein the alignment layers provide alignment restriction power for arranging a major axis of the liquid crystal molecules that constitute the liquid crystal layer in parallel toward the first substrate and second substrate by arranging the alkane chains having at least 18 carbons in parallel toward the substrate at the side of the liquid crystal alignment layer.

BRIEF DESCRIPTION OF THE DRAWING FIGURES

The accompanying drawings are included to illustrate preferred embodiments of the invention.

DETAILED DESCRIPTION OF THE PREFERRED EMBODIMENTS

Referring to attached drawings, a detailed description of a liquid crystal display device and method for fabricating thereof in accordance with the invention are described below. The following detailed description merely illustrates the best mode of the invention and is not to be construed as limiting the metes and bounds of the invention, which are set forth in the claims.

A perpendicular alignment type liquid crystal display device using a liquid crystalline perpendicular alignment material has been developed to solve the above-mentioned problems of rubbing alignment. This perpendicular alignment type liquid crystal display device uses the perpendicular alignment material to control the alignment direction of the liquid crystal alignment film, and the conventional rubbing treatment is not required to form the liquid crystal alignment film, since the alignment direction of the perpendicular alignment material is decided by the reaction of the alignment material.

Figure 1:
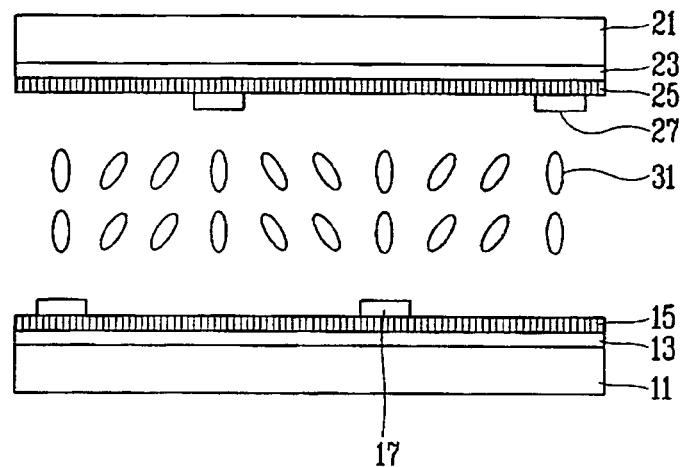
FIG. 1 shows a conventional perpendicular alignment type liquid crystal display device.

FIG. 1 shows a cross-sectional view of a conventional perpendicular alignment type liquid crystal display device. The substrates 11 and 21 are processed by the surface treatment to approximately perpendicularly align the major axis of liquid crystal molecules 31 constituting the liquid crystal layer to the substrates 11 and 21.

That is, the perpendicular alignment type liquid crystal display device applies the liquid crystal perpendicular alignment material on the substrates 11 and 21 and first and second electrodes 13 and 23 to form liquid crystal alignment layers 15 and 25, which perpendicularly align the liquid crystal molecules 31 toward the first substrate 11 and the second substrate 21. The liquid crystal molecules 31 have a negative dielectric anisotropy in the separated region of the two substrates 11 and 21.

Here, the liquid crystal perpendicular alignment material makes the major axis of the liquid crystal molecules 31 arrange perpendicularly toward the liquid crystal alignment layers 15 and 25 when the voltage is not applied across electrodes 13 and 23. The liquid crystal molecules 31 arrange diagonally according to the direction of the electric field when the voltage is applied across the electrodes 13 and 23. That is, the transmittance of the light is controlled by moving the major axis of the liquid crystal molecules 31 from the perpendicular direction to the horizontal direction toward the perpendicular alignment layer.

Also, the liquid crystal perpendicular alignment material forms additional projections such as rib 27 over the upper substrate 21 and rib 17 over the lower substrate 11, thereby allowing modification of the light angular field of the liquid crystal display device by distorting the electric field applied to the liquid crystal layer.

As a result, the above-described perpendicular alignment type liquid crystal display device can be manufactured without a separate rubbing process by forming the liquid crystal alignment film by using a liquid crystal perpendicular alignment material.

Figure 2:
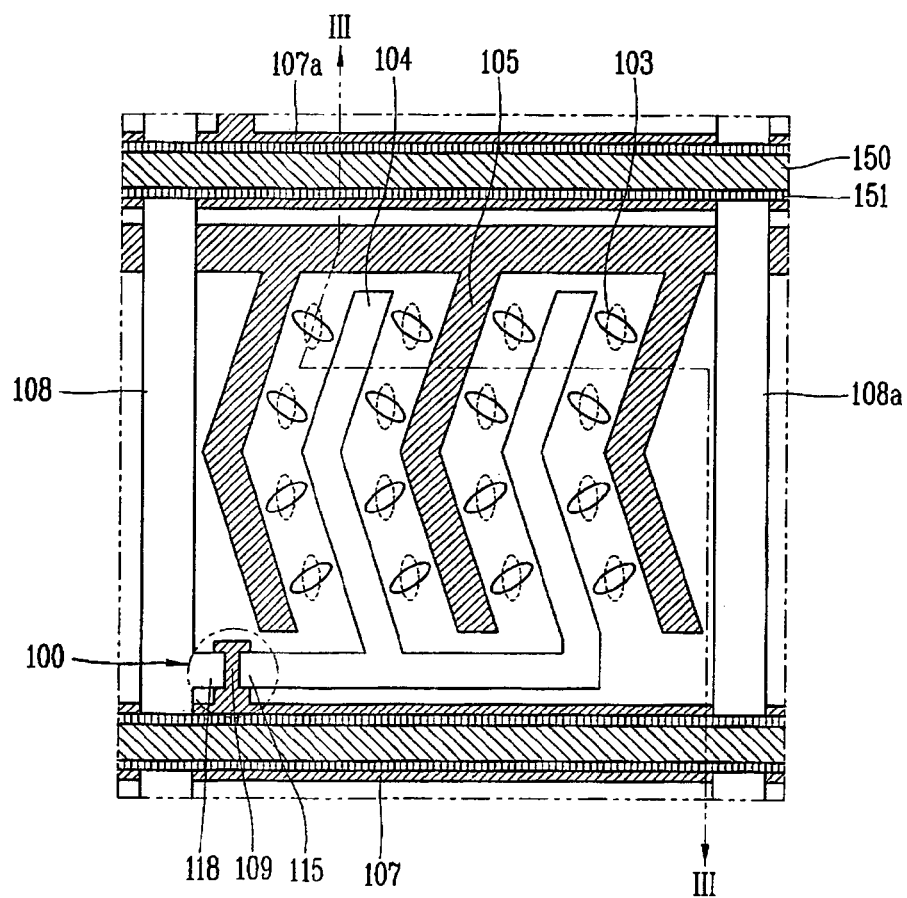
FIG. 2 shows a unit pixel of the liquid crystal display device in accordance with the invention.
Figure 3:
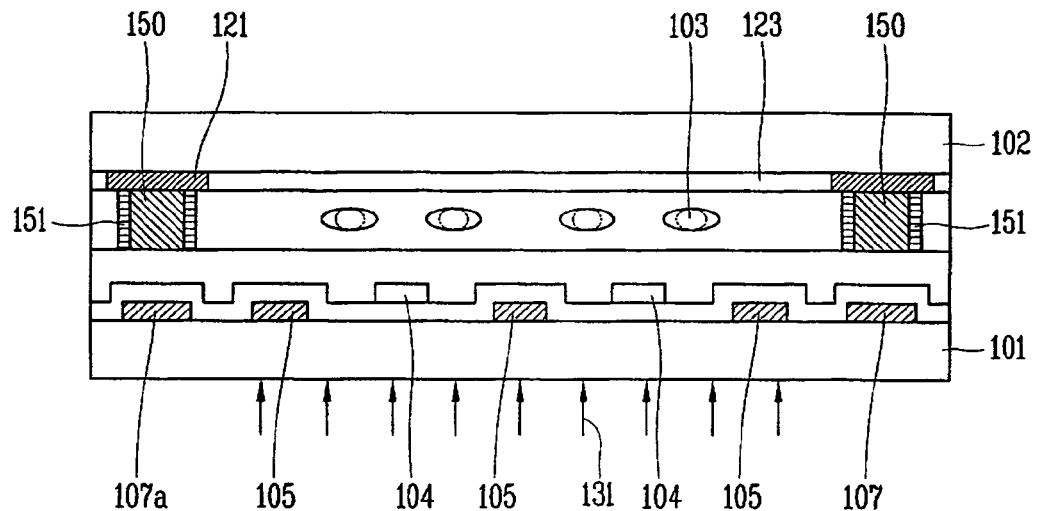
FIG. 3 shows a cross-sectional view of the liquid crystal display device taken along line III-III of FIG. 2.

FIG. 2 shows a plane view of a unit pixel region of an IPS mode liquid crystal display device in accordance with the invention, and FIG. 3 is a cross-sectional view of the liquid crystal display device taken along line III-III of FIG. 2 in accordance with the invention.

The IPS mode liquid crystal display device in accordance with the invention includes but is not limited to a first substrate 101 that is a thin film transistor substrate, a second substrate 102 that is a color filter substrate, and a liquid crystal layer formed between the first substrate 101 and the second substrate 102. A gate line 107 and a data line 108 define the unit pixel region by crossing each other at first substrate 101, and a thin film transistor switching device 100 is formed at the cross region of the gate line 107 and the data line 108. Pixel electrodes 104 and common electrodes 105 are alternatively arranged at each unit pixel region.

In addition, the thin film transistor 100 includes a gate electrode 109 that is formed as a part of the gate line 107, a semiconductor layer (not shown) that becomes channel region, a source electrode 118 that is formed as a part of the data line 108, and a drain electrode 115 that is faced with the source electrode 118, is formed.

Accordingly, if the semiconductor layer is activated by a scanning signal applied through the gate electrode 109, the data signal of a data line 101 is transmitted from a source electrode 118 to a drain electrode 115 and is applied to a pixel electrode 104. Then, an in-plain switching electric field is generated between the data signal applied to the pixel electrode 104 and the common electrode 105, to which was applied the common signal, and an image is generated by controlling the light transmittance of the liquid crystal layer 103.

Also, the pixel electrode 104 and common electrode 105 are formed at a desired angle, preferably about 45 degrees, toward the extended direction of the gate line 107.

In the invention, a black matrix 121 (that prevents light leakage) and a color filter 123 (that embodies colors such as red, green and blue) are formed over the second substrate 102. An upper polarizer (not shown) and a lower polarizer (not shown) are arranged at an upper part of the second substrate 102 and the lower part of the first substrate 101, respectively, as shown in FIG. 3.

Although not shown in the drawings, a back light unit may be arranged at the lower part of the first substrate 101, and the light 131 provided by the back light unit is provided to the interior of the liquid crystal display device through the first substrate 101, and an image is thus shown by the liquid crystal display device.

Each unit pixel region of the liquid crystal display device in accordance with a preferred embodiment of the invention has a width of about at least about 100 µm, and a gate line 107 is formed at a distance of at least about 100 µm from the next gate line 107a.

A liquid crystal alignment layer 150 where the straight type alkane chains having at least 18 carbons are arranged in parallel toward the first substrate and second substrate (that is, the director of the carbon chain is normal to the surfaces of the first substrate and the second substrate) is formed at the upper part of the gate line 107, 107a. The liquid crystal alignment layer 150 also provides alignment restriction power to arrange the major axis of the liquid crystal molecules 103 that constitute the liquid crystal layer in parallel toward the first substrate and the second substrate.

That is, the wall-type liquid crystal alignment layer 150 of the invention provides the major axis of the liquid crystal molecule 103 with an alignment power for moving left and right by positioning in parallel directed toward the first substrate 101 and the second substrate 102. In particular, when the voltage is not applied to the common electrodes 105 and pixel electrodes 104, the liquid crystal molecules 103 (dotted line) are designed to perpendicularly arrange toward the side part of the liquid crystal alignment layer 150.

In other words, the liquid crystal molecules 103 (dotted line) express the black mode by arranging in the direction perpendicular to the data line 108 before the voltage is applied to the electrodes 104 and 105. When the voltage is applied, the liquid crystal molecules 103 (dotted line) absorb the light by rotating according to the direction of the width of the electric field.

In the invention, the liquid crystal alignment layer may be formed at any place of the upper part of light block region of the first substrate and the second substrate including the upper part of the data lines 108 and 108a.

The liquid crystal display device of the invention prevents rubbing defects from occurring on the substrates 101 and 102 by aligning the liquid crystal perpendicular to the direction of the side of the liquid crystal panel. This is different from the conventional IPS mode liquid crystal display device that applies the liquid crystal alignment layer on the upper and the lower substrates.

Figure 4:
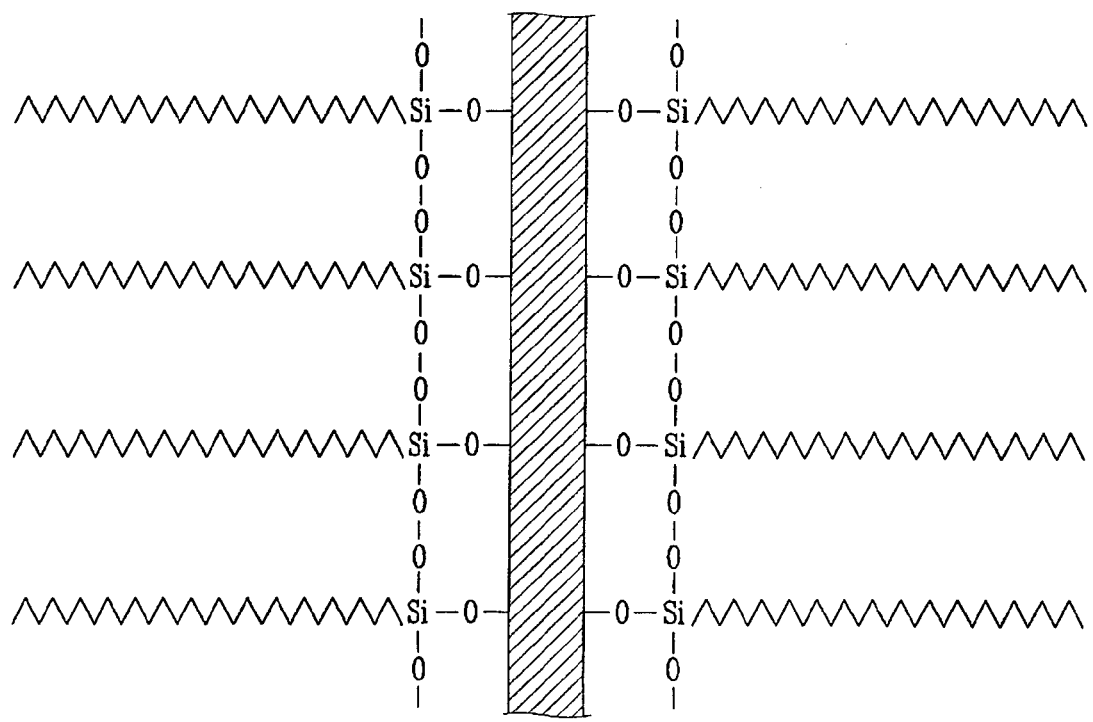
FIG. 4 shows an upper view of the liquid crystal display device that forms the liquid crystal alignment film of the self-assembled monolayer at the side of the sub-layer in accordance with the invention.

FIG. 4 shows the configuration of the liquid crystal alignment layer of the side surface method. FIG. 4 shows an upper direction view of the liquid crystal display device that forms the liquid crystal alignment layer of the self-assembled monolayer at the side of a sub-layer i.e., a dissepiment or partition.

The major axis of the liquid crystal molecules of the invention is perpendicularly aligned toward the gate line if the voltage is not applied, and the liquid crystal alignment layer of the invention therefore forms as a liquid crystal perpendicular alignment material to perpendicularly align the liquid crystal at the side.

For example, the liquid crystal alignment layer of the invention could be formed as a polyimide resin having a repeat unit n as shown in chemical formula 1 below. In chemical formula 1, R1 is a tetravalent organic group and R2 is a straight alkane chain having at least 18 carbons. However the alkane may also have some branching.

[chemical formula 1]

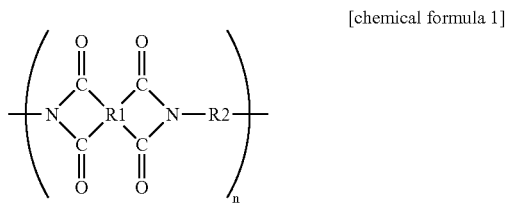

In chemical formula 1, the straight alkane chains are densely arrayed in a linear configuration at the surface of the sub-layer by interacting with the next alkane chain, and are thus perpendicularly arranged at the side of the liquid crystal alignment layer. This configuration thereby provides the alignment restriction power that perpendicularly aligns the nematic liquid crystal molecules that are in contact with the straight type alkane chains toward the surface of the sub-layer.

Also, the liquid crystal display device of the invention could form a separate partitioned sub-layer on the light block region to form a side method liquid crystal alignment layer and also form the liquid crystal alignment layer to that surface. In this case, the sub-layer is formed by the inorganic insulating materials such as SiOx, SiNx, SiAlNx and the like and separately constitutes the liquid crystal alignment layer by forming the self-assembled monolayer on that surface.

The self-assembled monolayer is a molecular group that is chemically absorbed onto the side of the sub-layer. The molecule group includes the straight type alkane chains having at least 18 carbons that perpendicularly align the liquid crystal molecules.

Also, the self-assembled monolayer is an organic molecule layer that voluntarily coats at the surface of the given substrate and is well arranged. The surfactant molecule used to the manufacture of the self-assembled monolayer is largely composed of three parts: 1) a reaction group of the head part that combines with the substrates, 2) a long alkane chain of the body part that enables to form a regular molecule film and 3) a functional group of the tail part that controls the function of the molecule film.

In the monolayer, the reaction group chemically absorbs onto the sub-layer by its affinity for the sub-layer surface, and the attractive force between the alkane chains densely arrays the molecules. Changing the length of the alkane chains and/or the type of functional group can also control the accumulation structure and character.

The surfactant used for manufacturing the self-assembled monolayer is a chemisorption material. This chemisorption material may be selected from surfactants containing straight alkane chains including the silylated organics having chlorosilylation, alkoxysilylation or isocyanatesilylation moieties at the terminal functional group, for example, $CH_3(CH_2)_{18}$ $SiCl_3$, $CH_3(CH_2)_{20}SiCl_3$, $CH_3(CH_2)_{22}SiCl_3$, $CH_3(CH_2)_{24}SiCl_3$, $CH_3(CH_2)_{26}SiCl_3$, and the like could be used.

Also, one end of the molecules having the straight type alkane chains is fixed on the surface of the sub-layer by the bonding of the siloxane moiety with the surface. Further, it is preferable that the molecular groups of the liquid crystal alignment layer be combined by the mutual combination with siloxane.

An example of the constitution of the monomolecular film, which uses $SiCl_4$ as a chemical material for chlorosilylation and where the hydrophilic moiety of the sub-layer is hydroxyl, is as follows. First, the hydroxyl and the chlorosilylation moiety $SiCl_4$ included on the surface of the sub-layer reacts by removing hydrochloric acid, and the chlorosilylated molecule is fixed on the surface of the sub-layer by the combination of siloxane as shown in the chemical formula 2 below.

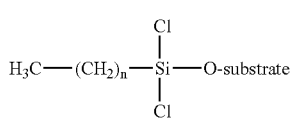

[Chemical formula 2]

By drying the sub-layer where the surfactant molecule is chemically combined in the atmosphere, the surfactant molecule that is chemically absorbed at the surface of the substrate and the moisture in the air react and hydrochloric acid is removed, and the combination of dechlorinated siloxane occurs as shown in chemical formula 3 below.

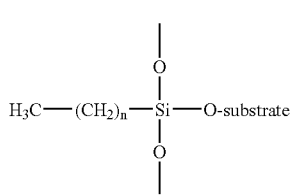

[Chemical formula 3]

As shown in FIG. 4, the film formed by this process is a chemically absorbed molecular film containing a molecular group fixed on the surface of the substrate, and this molecular group is combined with the substrate by the combination of siloxane with the surface. This technology has the advantages of high uniformity and resistance to desquamation or delamination, since the molecular groups are combined with the other monomolecules, i.e., monomers, and the surface through the Si—O— linkages. That is, the molecular film can be considered to be a polymerized monolayer that is also chemically bonded to the underlying substrate material.

Below is described a preferred method for manufacturing a liquid crystal display device having a lateral alignment liquid crystal in accordance with a preferred embodiment of the invention.

The method for manufacturing the IPS mode liquid crystal display device in accordance with the embodiment of the invention may include the steps of preparing a first substrate, forming common electrodes and pixel electrodes substantially arranged in parallel over the first substrate, forming a data line over the first substrate, preparing a second substrate, preparing a liquid crystal alignment layer including straight alkane chains having at least 18 carbon atoms arranged in parallel toward the substrates, and forming the liquid crystal layer between the first substrate and the second substrate.

The step of preparing the liquid crystal alignment layer can include the sub-steps of preparing polyimide precursor solution including the straight type alkane chains having at least 18 carbons, preparing polyimide thin film by heat treating the polyimide precursor solution at the temperature of 0° C. to 400° C., and patterning the shape of the liquid crystal alignment layer by dry-etching the coated polyimide thin film.

Through the above-described process, the liquid crystal alignment layer that arranges the straight alkane chains having at least 18 carbons is formed at the side surface. The solution method is preferable for the polymerization method of the polyimide precursor.

The liquid crystal alignment layer may be formed by printing the polyimide thin film including the straight alkane chains on the light block region of the liquid panel by inkjet printing.

Also, the liquid crystal alignment layer of the invention may be formed by self-assembling a monolayer containing a silane surfactant molecular group. In this case, a sub-layer for forming the liquid crystal alignment layer should additionally be prepared. The formation of the liquid crystal alignment layer may then include forming the sub-layer on the light block region of the liquid panel with inorganic insulating layer or a metal such as Au, preparing the chemisorption solution by adding a surfactant having the straight alkane chains of at least 18 carbon atoms to a non-aqueous organic solvent, contacting by soaking the surface of the sub-layer in the chemisorption solution, and drying the sub-layer into the air.

The solvents used in this process may include alkanes, fluorocarbons, chlorinated hydrocarbons, siloxanes and the like. More specifically, it is preferable to use straight or branched hexadecane, FREON type solvents including fluorocarbon groups and carbon chloride groups, and hexamethylenedisiloxane as non-aqueous solvents to decrease the moisture content and to form the uniform molecular films.

Further, if the chemisorption solution is contacted to the surface of the sub-layer, the surfactant molecule is fixed on the surface of the sub-layer by the siloxane combination generated by removing hydrochloric acid during the reaction between the chlorosilylated and hydroxyl groups. Subsequently, if this sub-layer is dried in air containing moisture after being removed from the solution, the siloxane combination between the molecules occurs by the hydrochloric acid removal reaction between the surfactant molecules chemically absorbed on the surface of the sub-layer and the moisture of the air.

As a result, the lateral method liquid crystal alignment layer of the liquid crystal display device in accordance with the invention produces a liquid crystal display device without using separate rubbing process by forming a nematic liquid crystal as the high polymer alignment layer that arranges perpendicularly toward the side of the liquid crystal alignment layer.

Therefore, the invention substitutes the liquid crystal alignment layer formed on the surface of the conventional substrate by forming a liquid crystal alignment layer that uses a perpendicular alignment material of liquid crystal on the light block region between the first substrate and the second substrate that constitutes the liquid panel, thereby avoiding defects on the substrate caused by the conventional rubbing process.

Accordingly, the liquid crystal display device in accordance with the invention is not limited to the inner design geometry such as the structure of the electrode and the like. In other words, although it was not described in the specification, the shape and the quality of the material and the like of the common electrodes and the pixel electrodes may be changed. Further, the region that forms the liquid crystal alignment layer of the invention is not limited to the upper part of the data line and could be formed in any region within the light block region of the first substrate and the second substrate that constitute the liquid crystal panel.

The invention decreases the running voltage of the liquid crystal and improves the contrast ratio by providing a liquid crystal display device using the lateral liquid crystal alignment method and could provide the liquid crystal display device that has high quality display characteristics by preventing defects arising from the friction of rubbing fabric on the substrate.

Therefore, even although it may not be described in the specification, the liquid crystal display device of the invention may be practiced in various embodiments within the scope of the invention, and the metes and bounds of the invention should not be determined from the above detailed description but from the attached claims.

What is claimed is:

1. A liquid crystal display device, comprising:
   a first substrate;
   a second substrate;
   a liquid crystal injected between the first substrate and the second substrate; and
   a liquid crystal alignment layer containing alkane chains having at least 18 carbon atoms arranged in parallel directed toward the first substrate and the second substrate, wherein the liquid crystal alignment layer is formed of polyimide resin having a chemical formula:

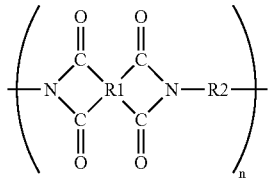

where R1 is a tetravalent organic group and R2 is a straight alkane chain having at least 18 carbon atoms.

2. The device of claim 1, wherein the liquid crystal alignment layer is formed at an upper part of a light block region of the first substrate and the second substrate.

3. The device of claim 1, which is an IPS mode liquid crystal display device, further comprising:
   at least one common electrode and pixel electrode substantially alternatively arranged in parallel over the first substrate;
   a gate line and a data line that define a unit pixel region by arranging in parallel; and
   a thin film transistor formed at the unit pixel region that alternatively arranges the gate line and the data line.

4. The device of claim 3, wherein the gate line is formed at a distance of at least 100 μm from the next gate line.

5. The device of claim 4, wherein the common electrode and the pixel electrode are formed at an angle of more than 0 degrees and less than 45 degrees toward an extended direction of the gate line.

6. The device of claim 5, wherein the liquid crystal alignment layer is formed at an upper part of the gate line.

7. The device of claim 1, wherein the straight alkane chains arrange the liquid crystal molecules of the liquid crystal layer in parallel toward the substrates at a side of the liquid crystal alignment layer.

8. The device of claim 1, which additionally includes a sub-layer for forming the liquid crystal alignment layer.

9. The device of claim 8, wherein the sub-layer is made from an inorganic insulating layer comprising SiOx, SiNx, or metal comprising Au, Ag or Al.

10. The device of claim 9, wherein the liquid crystal alignment layer has a molecular group that is chemically absorbed at a side of the sub-layer, and the liquid crystal alignment layer forms from a self-assembled monolayer including the straight type alkane chains having at least 18 carbon atoms.

11. The device of claim 10, wherein the molecular group includes silylated organics selected from the group consisting of chlorosilylated organics, alkoxysilylate organics and isocyanatesilylated organics.

12. The device of claim 11, wherein the liquid crystal alignment layer is bonded to a surface of the sub-layer via siloxane bonding.

13. The device of claim 11, wherein the liquid crystal alignment layer forms a polymeric monolayer via siloxane bonding.

14. The device of claim 1, wherein the second substrate is a color filter substrate.

15. A method for fabricating a liquid crystal display device, comprising the steps of: providing a first substrate;
   forming a gate line over the first substrate;
   forming common electrodes and pixel electrodes substantially arranged in parallel over the first substrate;
   providing a second substrate;
   forming a liquid crystal alignment layer including the straight alkane chains having at least 18 carbon atoms arranged in parallel toward the first substrate and the second substrate, wherein the liquid crystal alignment layer is formed of polyimide resin having a chemical formula:

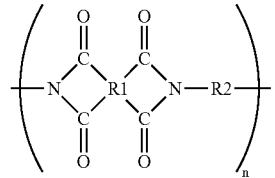

where R1 is a tetravalent organic group and R2 is a straight alkane chain having at least 18 carbon atoms; and
   forming a liquid crystal layer between the first substrate and the second substrate.

16. The method of claim 15, wherein the step of preparing the liquid crystal alignment layer comprises the steps of:
   preparing polyimide precursor solution including the straight alkane chains having at least 18 carbon atoms;
   preparing polyimide thin film by heat treating of the polyimide precursor solution at the temperature of 0° C. to 400° C.; and
   patterning in the shape of the liquid crystal alignment layer by dry-etching the coated polyimide thin film.

17. The method of claim 16, wherein the liquid crystal alignment layer forms the polyimide thin film including the straight alkane chains on the substrate by an inkjet printing method.

18. The method of claim 15, wherein the step of forming the liquid crystal alignment layer comprises the steps of:
   forming the sub-layer with inorganic insulating layer or Au;

preparing a chemisorption solution by adding a sufactant having the straight type alkane chains having at least 18 carbon atoms to a non-aqueous organic solvent;

contacting by soaking a surface of the sub-layer to the chemisorption solution; and drying the sub-layer in air.

19. A liquid crystal display device, comprising:

a first substrate;

a second substrate;

at least one common electrode and pixel electrode that generate a horizontal electric field by substantially alternatively arranging in parallel over the first substrate;

a liquid crystal layer injected between the first substrate and the second substrate; and a plurality of liquid crystal alignment layers formed between the first substrate and the second substrate, wherein the alignment layers provide alignment restriction power for arranging a major axis of the liquid crystal molecules that constitute the liquid crystal layer in parallel toward the first substrate and second substrate by arranging the alkane chains having at least 18 carbons in parallel toward the substrate at the side of the liquid crystal alignment layer, wherein the liquid crystal alignment layer is formed of polyimide resin having a chemical formula:

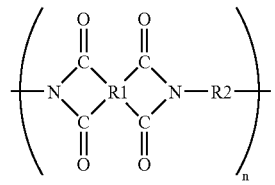

where R1 is a tetravalent organic group and R2 is a straight alkane chain having at least 18 carbon atoms.

* * * * *

UNITED STATES PATENT AND TRADEMARK OFFICE
CERTIFICATE OF CORRECTION

PATENT NO.         : 7,476,424 B2                                                Page 1 of 1
APPLICATION NO. : 11/311345
DATED              : January 13, 2009
INVENTOR(S)        : Ho-Young Jeong et al.

It is certified that error appears in the above-identified patent and that said Letters Patent is hereby corrected as shown below:

On the title page of the Letters Patent at Item 73:

"LG Philips LCD Co., Ltd., Seoul (KR)" should read --LG Display Co., Ltd., Seoul (KR)--

Signed and Sealed this

Sixth Day of April, 2010

David J. Kappos
*Director of the United States Patent and Trademark Office*